Figure 1:
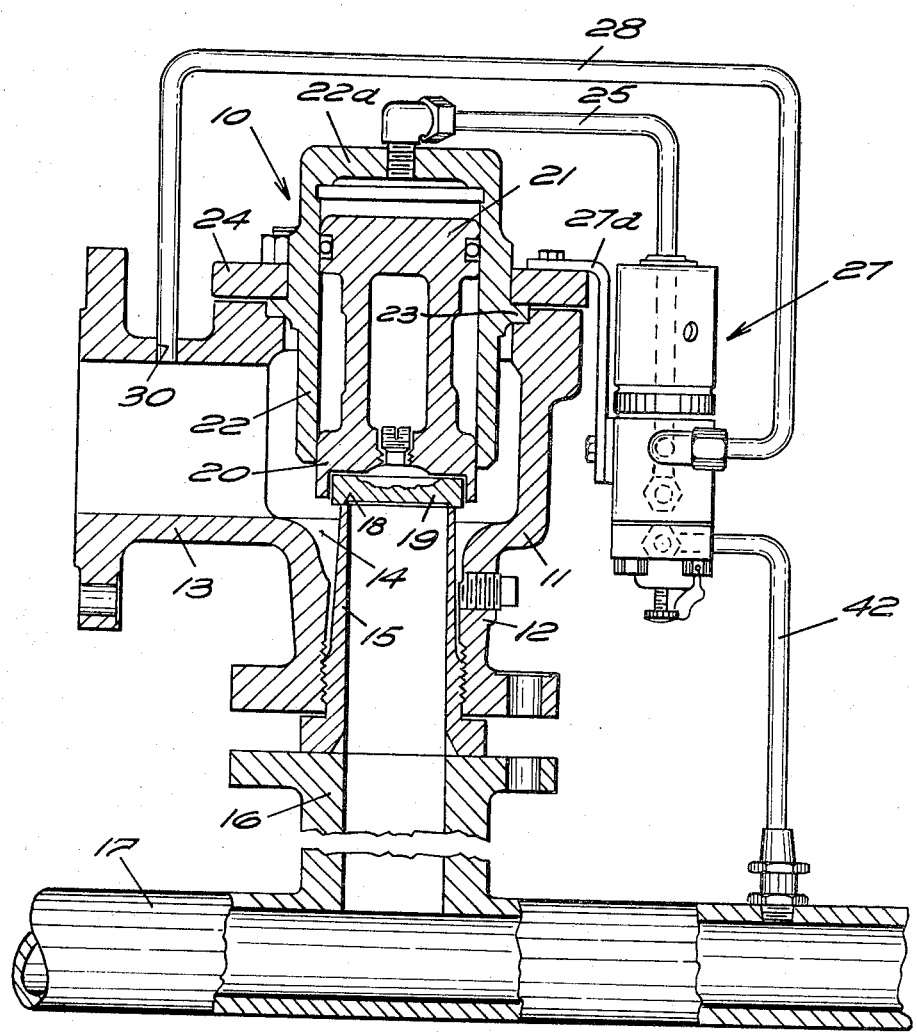

United States Patent Office 3,304,951
Patented Feb. 21, 1967

3,304,951
SAFETY VALVES
Victor W. Farris, 104 Woodland St.,
Englewood, N.J. 07631
Filed Aug. 30, 1965, Ser. No. 483,542
1 Claim. (Cl. 137—492)

This invention relates to safety valves and more particularly to safety valves in which a main valve disc is exposed to the pressure generated in a fluid-containing vessel in such manner as normally to maintain such disc closed, and in which a pilot control mechanism senses said pressure and (a) upon the pressure reaching a predetermined magnitude, brings about an alteration in the exposure of the main valve disc to permit the opening of such disc, and (b) upon subsequent reduction of said pressure to said predetermined magnitude, brings about reestablishment of the initial exposure of the main valve disc to cause the closing of such disc.

The present invention constitutes a continuation-in-part of (a) my abandoned application, Ser. No. 201,359, filed June 11, 1962, (b) my application, Ser. No. 434,175, now Patent No. 3,221,765, issued December 7, 1965, filed February 16, 1965, as a substitute for my abandoned application, Ser. No. 275,161, filed April 23, 1963, and (c) my copending application, Ser. No. 462,998, filed June 10, 1965.

The present invention differs from the prior art and my earlier applications identified above in that (i) when set pressure is reached, a novel pilot valve mechanism completely isolates the main valve disc from the fluid-containing vessel to be protected whereby delay in the lift to maximum capacity of the main valve disc is held to a minimum, (ii) such pilot valve mechanism includes a pair of simultaneously operated pilot mechanism valves cooperable in such manner that one of them senses the pressure in the fluid-containing vessel until set pressure is reached, whereupon the sensing function is transferred to the other in a manner to assure adequate lift of the main valve disc and sustained exhaust during blowdown, and (iii) appropriate performance of the device is predetermined by built-in characteristics inaccessible to tampering.

The foregoing method of operation is achieved in the following manner, it being assumed that the valve is being used to relieve excessive pressure generated in a fluid-containing vessel.

A main valve has the usual inlet and outlet ports and a main valve disc controlling communication therebetween. A piston is slidable in the body of the main valve and is operatively connected with the main valve disc. The main valve disc and the piston are both exposed to the pressure of the fluid in the fluid-containing vessel to provide first and second forces in directions tending, respectively, to open and close the disc. However, the relative areas of the disc and the piston are such that the closing force on the piston is greater than the opening force on the disc and the latter remains closed.

A pilot mechanism is provided for controlling the exposure of the piston to the vessel fluid pressure whereby when such pressure reaches a predetermined value, the closing force against the piston is reduced to below the opening force against the disc and the latter immediately opens to its full capacity to relieve the excessive vessel pressure.

Said pilot mechanism includes a housing having a plurality of chambers therein, one of said chambers communicating with the fluid-containing vessel to be protected, another of said chambers communicating with the main valve body above the piston which is operatively connected to the main valve disc, and a third of said chambers communicating with a fluid exhaust means.

A plunger is slidably mounted in said pilot mechanism housing and is ported to provide communication between the first and second chambers above referred to and between the second and third chambers above referred to.

Said plunger carries a pair of pilot mechanism valves, one of which controls the communication between the first and second above referred to chambers and the other of which controls the communication between the second and third of the chambers above referred to.

An adjustable spring means applies a pre-selected force to said plunger in a manner which normally maintains the first of the valves carried thereby opened and the second of the valves carried thereby closed.

When the pressure in the fluid-containing vessel to be protected reaches the set pressure of the overall system the second of the pilot mechanism valves, which may be considered as a trigger relay valve, commences to open. Because of the relative areas of this valve and its seat, as soon as this valve commences to open, amplification of the force exerted thereagainst occurs and the valve immediately attains maximum lift to establish communication between the second and the third chambers of the pilot mechanism housing. When this occurs, a flowing condition is established between the space above the main valve piston and the discharge whereby the force which previously held the main valve disc closed is removed and said main valve disc can open to relieve the excessive pressure generated in the fluid-containing vessel to be protected.

As the second plunger-carried valve opens, the first plunger-carried valve, which may be considered as a blowdown relay valve, closes, thus isolating the piston of the main valve disc from the static pressure in the fluid-containing vessel. As a result, delay in the discharge to exhaust of the fluid which previously held the main valve disc closed is minimized.

The area of the blowdown relay valve is slightly greater than the area of the trigger relay valve, so that when these relay valves attain their discharge conditions, the pressure-sensing function of the trigger relay valve is transferred to the blowdown relay valve which, being then exposed to the static pressure in the fluid-containing vessel to be protected, assures maximum blowdown until the pressure in said vessel is reduced to at least the set pressure of the overall system. When such reduced pressure is reached, the spring force on the pilot mechanism plunger is sufficient to return the trigger and blowdown relay valves to their original positions and reestablish the original pressures operating on the main valve disc to close the same.

In the following specification there is described, and in the annexed drawings shown, an illustrative embodiment of the present invention. In said drawings, FIG. 1 is a partially sectional, partially elevational view of the safety valve of the present invention, and FIG. 2 is an enlarged vertical sectional view of the pilot control mechanism of the present invention.

Figure 2:
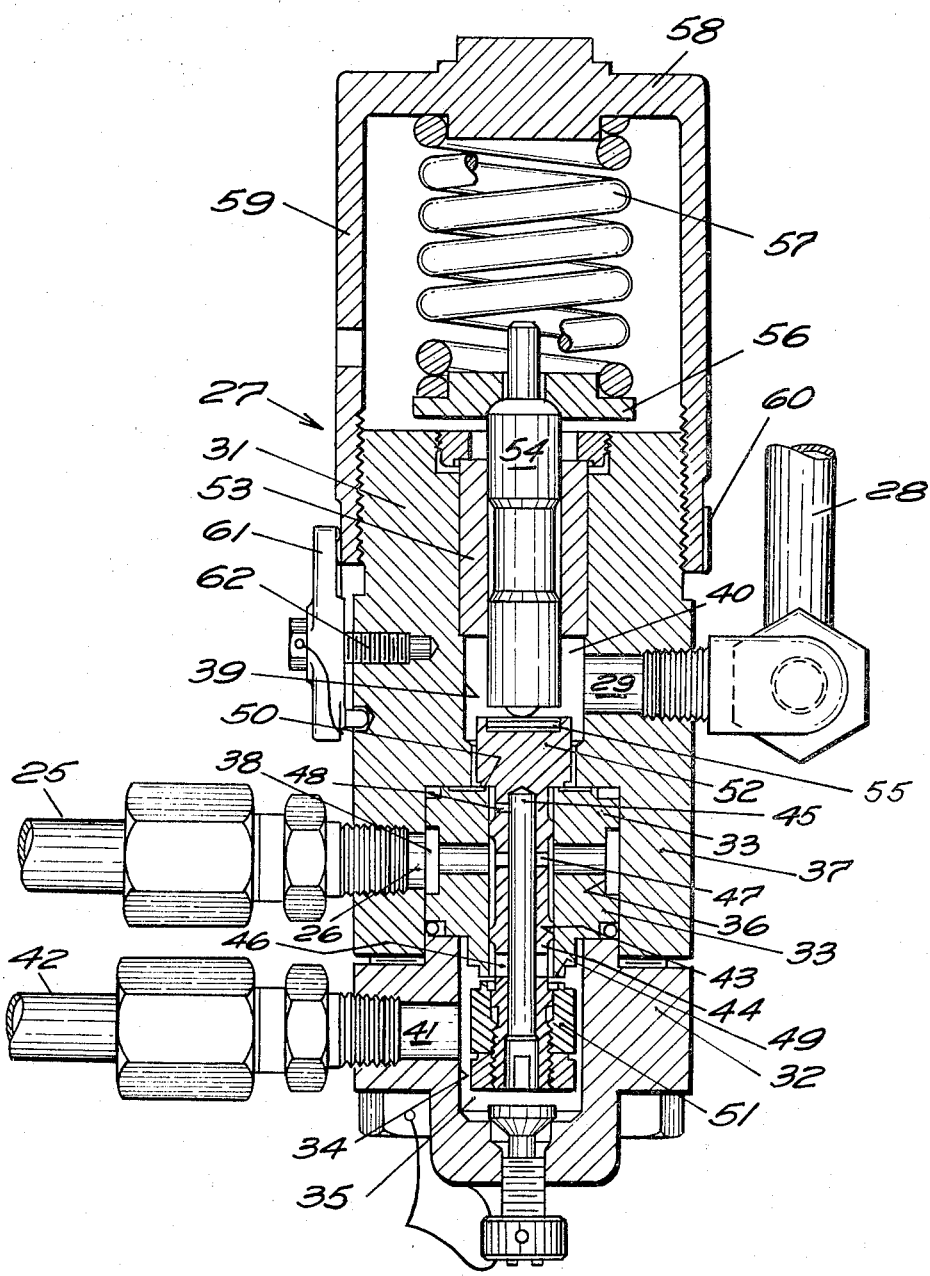

Referring now more in detail to the aforesaid illustrative embodiment of the present invention, particularly in FIG. 1 and FIG. 2 of the drawings thereof, the numeral 10 generally designates a safety valve which includes a main valve body 11 provided with a flanged inlet 12 and a flanged outlet 13 in communication with each other through a main body chamber 14.

The inlet 12 has secured therein a nozzle 15 of uniform internal diameter corresponding to the internal diameter of a flanged outlet 16 formed on a conduit 17 which may be considered as the fluid-containing vessel the pressure within which it is intended to control by the valve of the present invention.

A value seat 18 is formed at the inner end of the nozzle 15 and a valve disc 19 cooperates with said seat to control communication between the inlet and the outlet of the main valve body 11.

The valve disc 19 is carried in a disc holder 20, in turn, carried by a piston 21 which is slidably mounted in a cylinder 22, the latter having a dome 22a closing its upper end and being provided with a flange 23 by means of which it is secured on the upper end of the body 11 by a clamping ring 24.

A pipe 25 has one end communicating through the dome 22a with the interior of the cylinder 22 above the piston 21, the other end of this pipe communicating with an outlet port 26 of a pilot control mechanism 27 which may be affixed to the main valve body 11 by means of a bracket 27a. Another pipe 28 has one end connected with another outlet port 29 of the pilot control mechanism 27, the other end of this pipe being connected to a discharge or exhaust passage 30 formed in the outlet 13 of the main valve body 14.

The pilot control mechanism 27 includes upper and lower body members 31 and 32 of a housing which incorporates a block 33. One end of the block 33, in cooperation with a recessed portion 34 in the lower body member 32, provides a first chamber 35. The block 33 is peripherally recessed, as at 36, to provide, together with an adjacent cup-like portion 37 of the upper body member 31, a second chamber 38. The other end of the block 33, in cooperation with a bore 39 in the upper body member 31, provides a third chamber 40.

The first chamber 35 of the pilot control mechanism 27 communicates, through an inlet port 41, with one end of a pipe 42 the other end of which is coupled to the conduit 17. The second chamber 38 of the pilot control mechanism 27 communicates, through the port 26, with the pipe 25. The third chamber 40 of the pilot control mechanism 27 communicates, through the port 29, with the pipe 28.

The block 33 is provided with a bore 43 in which is slidably mounted a plunger 44 having a central passage 45 communicating with the chambers 35, 38 and 40 through ports 46, 47 and 48, respectively.

The end faces of the block 33 present seats 49 and 50 cooperable, respectively, with pilot mechanism valves 51 and 52 constituting, as will later be described, blowdown and trigger relay valves, respectively. Thus, communication between the chambers 35 and 38 is controlled by the pilot mechanism valve 51 and communication between the chambers 38 and 40 is controlled by the pilot mechanism valve 52.

The upper body member 31 of the pilot control mechanism 27 is provided with a liner 53 in which is slidably mounted a stem 54 the lower end of which bears against a thrust disc 55 carried by the trigger relay valve 52 and the upper end of which bears against a spring button 56. A coil spring 57 has its lower end engaging the button 56 and its upper end engaging the closed end 58 of a bonnet 59 threadedly engaged on the upper body member 31 of the pilot mechanism housing. The lower end of the bonnet 59 is provided with vertical serrations 60 engageable by a locking member 61 carried by a screw 62 threadedly engaged in the upper body member 31, whereby after the bonnet is rotated to appropriately set the force exerted by the spring 57 against the trigger relay valve 52, the bonnet may be locked in place.

This completes the description of the aforesaid illustrative embodiment of the present invention and its operation will now be described:

At the outset, the bonnet 59 is adjusted to set the pressure at which it is desired to protect the fluid-containing vessel 17. At this time, the trigger relay valve 52 will be closed and the blowdown relay valve 51 will be open.

A portion of the fluid in the fluid-containing vessel 17 enters the nozzle 15 of the main valve 10 and exerts a force against the disc 19 in a direction tending to open the same. Another portion of the fluid passes through the pipe 42 and enters the pilot control mechanism 27 through the port 41. This fluid fills the first pilot mechanism chamber 35, passes the open blowdown relay valve 51 and flows through the ported plunger 44 to enter the second pilot mechanism chamber 38. From there the fluid exits from the pilot control mechanism 27 through the port 26 and passes through the pipe 25 to enter the cylinder 22 of the main valve 10. This fluid exerts a force against the piston 21 and because the area of the piston is greater than that of the valve seat 18, such force maintains the main valve disc 19 closed.

A portion of the fluid in the passage 45 of the plunger 44 exits from such passage through the port 48 and exerts its pressure against the exposed area of the then closed trigger relay valve 52 which, at this time, functions as the pressure-sensing element.

As long as the pressure of the fluid in the fluid-containing vessel 17 remains below the pressure to which the pilot control mechanism 27 is set, a static condition is established. The trigger relay valve 52 remains closed, the blowdown relay valve 51 remains open, and the main valve disc 19 remains closed.

As soon as the pressure in the fluid-containing vessel 17 reaches set pressure, the trigger relay valve 52 pops open and the blowdown relay valve 51 snaps closed.

The opening of the trigger relay valve 52 sets up a flowing condition for the fluid previously acting against the piston 21 of the main valve 10 via the pipe 25, port 26, pilot mechanism chamber 38, plunger port 47, plunger passage 45, plunger port 48, pilot mechanism chamber 40, port 29 and discharge pipe 28. The resulting removal of the system pressure from the piston 21 enables the pressure against the underside of the main valve disc 19 immediately to open the same to maximum capacity whereby the excessively pressured fluid from the fluid-containing vessel 17 can pass through the main valve chamber 14 to the main valve outlet 13. In the meantime, the closing of the blowdown relay valve 51 has isolated the piston 21 from the pressure in the fluid-containing vessel 17 so that the release time of the pressure previously acting against such piston is minimized.

Inasmuch as the blowdown relay valve 51 is slightly larger in the area than the trigger relay valve 52 and said blowdown relay valve 51 alone is at this time exposed to and senses the static pressure in the fluid-containing vessel 17, the condition described in the immediately preceding paragraph continues until the pressure in said fluid-containing vessel 17 is reduced to below set pressure.

When this occurs, the spring 57 is able to overcome the system pressure against the blowdown relay valve 51 as a result of which the trigger relay valve 52 is returned to its normally closed position, the blowdown relay valve 51 is returned to its normally open position, and the initial static condition of the overall system is restored.

This completes the description of the operation of the present invention.

What is claimed is:

A safety valve for protecting a fluid-containing vessel against excessive fluid pressure generated therein comprising: a main valve body having main inlet and outlet ports and a main valve disc controlling communication therebetween; said main valve disc being adapted to be exposed to the fluid in said vessel to develop first and second forces thereagainst in directions tending, respectively, to open and close the same; said second force normally exceeding said first force whereby said main valve disc is normally closed; a pilot mechanism for controlling the exposure of said main valve disc to said second force; said pilot mechanism including a housing having first, second and third chambers therein; said first chamber communicating with said fluid-containing vessel, said second chamber communicating with said main valve body above said main valve disc, and said third chamber communicating with exhaust means; a plunger slidably mounted in said housing; said plunger being ported to provide communication between said first and second chambers and between said second and third chambers; first and second pilot mechanism valves carried at opposite ends of said plunger and cooperating with seats formed on opposite end faces of a block incorporated in said housing whereby said first pilot mechanism valve controlling communication between said first and second chambers, and said second pilot mechanism valve controlling communication between said second and third chambers; means exerting a force against said plunger to normally maintain said first pilot mechanism valve open and said second pilot mechanism valve closed; and means for adjusting the magnitude of said last-named force to set the fluid pressure at which it is desired to bring about the opening of said main valve disc; the effective area of said first pilot mechanism valve being greater than the effective area of said second pilot mechanism valve whereby once the pressure generated in said fluid-containing vessel equals or exceeds said set fluid pressure, said first pilot mechanism valve closes, said second pilot mechanism valve opens, and the sending of the pressure generated in said fluid-containing vessel is transferred from said second pilot mechanism valve to said first pilot mechanism valve until the pressure generated in said fluid-containing vessel is reduced to below said set fluid pressure.

References Cited by the Examiner

FOREIGN PATENTS 267,978   6/1927   Great Britain.

MARTIN P. SCHWADRON, *Examiner.*

M. CARY NELSON, *Primary Examiner.*